(12) United States Patent
Ishibashi et al.

(10) Patent No.: US 6,374,291 B1
(45) Date of Patent: *Apr. 16, 2002

(54) COMMUNICATION METHOD AND APPARATUS THAT EMPLOYS FACSIMILE TO ELECTRONIC MAIL CONVERSION THROUGH A COMPUTER NETWORK BY WAY OF THE INTERNET

(75) Inventors: Masakazu Ishibashi, Nagaokakyo; Hiroyuki Yasumoto, Uji, both of (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

(21) Appl. No.: 08/871,136

(22) Filed: Jun. 6, 1997

(30) Foreign Application Priority Data

Jun. 7, 1996 (JP) ............................................. 8-145315
Jul. 26, 1996 (JP) ............................................ 8-197707

(51) Int. Cl.⁷ ......................... G06F 15/16; G06F 15/173
(52) U.S. Cl. ...................... 709/206; 709/203; 709/238; 358/400; 358/402; 379/88.12; 379/93.24; 379/100.08; 379/88.13; 379/88.17; 379/100.06; 379/100.12; 379/100.13
(58) Field of Search ................................ 709/203, 206, 709/207, 238; 358/400, 402, 427, 405, 406, 440; 379/88.12, 88.13, 88.17, 93.07, 93.15, 93.24, 93.09, 100.01, 100.06, 100.08, 100.12, 100.13, 88.22, 88.08, 88.14, 90.01, 90.2, 93.01, 88.18, 100.11, 88.07; 370/264, 214, 265; 375/222; 340/310.01, 500; 395/200.36

(56) References Cited

U.S. PATENT DOCUMENTS

| 5,091,790 A | | 2/1992 | Silverberg ................... 358/434 |
| 5,115,326 A | * | 5/1992 | Burgess et al. ............. 358/440 |
| 5,138,653 A | | 8/1992 | Le Clercq ................ 379/93.24 |

(List continued on next page.)

FOREIGN PATENT DOCUMENTS

| JP | 07221785 A | * | 8/1995 |
| JP | 10107944 A | * | 8/1995 |
| JP | 8116422 A | * | 5/1996 |
| JP | 10042067 A | * | 2/1998 |

OTHER PUBLICATIONS

Sue Mosher, "Microsoft Exchange User's Handbook", Feb. 1997.*
Kulcullen et al., "Introducing Microsoft Exchange", Feb. 1997.*
Japanese Patent Abstract Publication No. 02058451.
European Search Report.

Primary Examiner—Robert B. Harrell
Assistant Examiner—William C. Vaughn, Jr.
(74) Attorney, Agent, or Firm—Armstrong, Westerman, Hattori, McLeland & Naughton, LLP.

(57) ABSTRACT

A communication terminal device of the present invention is provided with both facsimile communication function and electronic mail transmission/reception function. At the transmission side, scanned image data is coded by MH, MR method and the like, converted to text data, then edited according to electronic mail format for transmitting it as an electronic mail to computer network like internet. The transmission side also transmits by facsimile (by a circuit switching method) a transmission notification indicating transmission of the electronic mail and a signal indicating reception of the electronic mail. After receiving the signal requesting reception of the electronic mail, the receiving side receives the electronic mail from the computer network, converts it into image data and prints the image data out by facsimile.

23 Claims, 10 Drawing Sheets

U.S. PATENT DOCUMENTS

| | | | |
|---|---|---|---|
| 5,224,156 A | * 6/1993 | Fuller et al. | 379/93 |
| 5,404,231 A | 4/1995 | Bloomfield | 358/400 |
| 5,448,759 A | * 9/1995 | Krebs et al. | 455/517 |
| 5,497,373 A | * 3/1996 | Hulen et al. | 379/89 |
| 5,513,013 A | * 4/1996 | Kuo | 358/448 |
| 5,523,854 A | 6/1996 | Hornsby | 358/407 |
| 5,555,100 A | * 9/1996 | Bloomfield et al. | 358/402 |
| 5,559,721 A | * 9/1996 | Ishii | 395/200.36 |
| 5,608,786 A | * 3/1997 | Gordon | 395/200.36 |
| 5,675,507 A | * 10/1997 | Bobo, II | 358/400 |
| 5,742,668 A | * 4/1998 | Pepe et al. | 455/415 |
| 5,767,985 A | * 6/1998 | Yamamoto et al. | 358/402 |
| 5,793,498 A | * 8/1998 | Scholl et al. | 358/434 |
| 5,796,394 A | * 8/1998 | Wicks et al. | 345/329 |
| 5,812,639 A | * 9/1998 | Bartholomew et al. | 379/88.18 |
| 5,825,854 A | * 10/1998 | Larson et al. | 379/93.24 |
| 5,832,221 A | * 11/1998 | Jones | 709/206 |
| 5,838,768 A | * 11/1998 | Sumar et al. | 379/89 |
| 5,872,926 A | * 2/1999 | Levac et al. | 709/206 |
| 5,881,233 A | * 3/1999 | Toyoda et al. | 709/233 |
| 5,923,848 A | * 7/1999 | Goodhand et al. | 709/219 |
| 5,941,946 A | * 8/1999 | Baldwin et al. | 709/206 |
| 6,020,980 A | * 2/2000 | Freeman | 358/402 |
| 6,023,345 A | * 2/2000 | Bloomfield | 358/402 |
| 6,023,779 A | * 2/2000 | Fullam et al. | 379/88.13 |
| 6,025,931 A | * 2/2000 | Bloomfield | 358/402 |
| 6,032,192 A | * 2/2000 | Wegner et al. | 709/238 |
| 6,104,500 A | * 8/2000 | Alam et al. | 358/1.15 |

\* cited by examiner

(a) Third Party Table T1

| Speed Dial/One-touch Key | Third Party Name | Internet e-mail address | Facsimile Number | Facsimile Classification |
|---|---|---|---|---|
| Speed Dial 001 | ABC CORP. | abc@abc.or.jp | 075-123-4567 | G4 |
| Speed Dial 002 | Yamagami Shoten | yamagami@kyoto.or.jp | 075-321-1111 | G3 |
| One-touch A | Matt Shokai | abc0123@Niftyserve.or.jp | 06-789-2222 | G3 |
| One-touch B | Ichiba Corp. | inchiba@kyoto.or.jp | 075-345-3333 | G4 |

(b) User (Sender) Table T2

| User Name | User I.D. | Password | Internet e-mail address | Provider Classification |
|---|---|---|---|---|
| Jujo Ltd. | jujo | asdf | jujo@kyoto.or.jp | A |
| Tanaka Ichiro | tanaka | lkj | tanaka@kyoto.or.jp | A |
| Tanaka Ichiro | tanaka | lkj | tanaka@osaka.or.jp | B |

(c) Provider Table T3

| Telephone Number | Line Classification | Provider Name | Provider Classification |
|---|---|---|---|
| 075-222-7771 | Digital | OO Net | A |
| 06-555-3333 | Analog | XX Net | B |

```
From     :jujo@kyoto.or.jp
To       :abc@abc.or.jp
DATE     1996/05/31 Friday 08:30
Cc       :
Subject :TIFF(G3)
```

FIG. 11

Transmission Notification Report 1996.05.31 AM 8:45
Jujo Ltd

To:ABC Corp.

This is to inform you that an e-mail message has been sent. Thank you for your cooperation in this matter.

Transmission time :1996.05.31 AM 8:30
To                :abc@abc.or.jp
Sender            :jujo@kyoto.or.jp
Data type         :TIFF(G3)

No. of pages      :5
Data Volume       :560 kbytes

Sample of image data:

FIG. 12

Reception Notification Report 1996. 05. 31 AM 9:15
ABC Corp.

To:Jujo Ltd.

This is to inform you that an e-mail message has been received.
Thank you for your cooperation in this matter.

Reception time :1996. 05. 31 AM 9:00
To :abc@abc.or.jp
Sender :jujo@kyoto.or.jp
Data type :TIFF(G3)

No. of pages :5
Data Volume :560 kbytes

COMMUNICATION METHOD AND APPARATUS THAT EMPLOYS FACSIMILE TO ELECTRONIC MAIL CONVERSION THROUGH A COMPUTER NETWORK BY WAY OF THE INTERNET

BACKGROUND OF THE INVENTION

1. Technical Field

The present invention relates to a communication terminal apparatus and communication method able to be connected to a computer network such as the internet or the like.

2. Background Art

Conventionally, communication by facsimile devices is largely carried out through public subscriber telephone networks. However, the cost necessary for facsimile communication through such public subscriber telephone network increases in proportion to the distance between the communicating parties.

Recently however, the use of computer networks such as the internet or the like is becoming more widespread. If this computer network is used, communication with domestic and foreign terminals is possible while only bearing communication costs as far as the nearest contract provider (company providing contact to the computer network). As a result, the costs required for, in particular, long distance communication may be reduced by carrying out communication using the computer network.

Facsimile communication is generally carried out using circuit switching systems. In short, the transmitting side facsimile device performs transmission of image data after being connected to the receiving side facsimile device and establishing a communication line by the circuit switching systems. Accordingly, when the receiving side facsimile device receives the image data, it is able to immediately print out that received image data and the receiving side user is able to know at that time that data has been received.

In contrast with this, when electronic mail is transmitted using a computer network, in general there is no direct notification to the receiving side that electronic mail has been transmitted. In short, users of computer networks notice that there has been reception of an electronic mail only when his/her communication terminal is connected to the computer network by dialing. Accordingly, even if the transmitting side sends electronic mail to a computer network, the receiving side does not immediately know there has been transmission of electronic mail addressed to it. As a result, the user of a computer network must dial up and confirm whether or not electronic mail has been delivered at suitable times (for example, everyday, at a certain time) and that operation is troublesome. Furthermore, when the transmitting side wants to immediately inform the receiving side of the contents of the electronic mail, it is necessary to inform the receiving side of the transmission of the electronic mail by telephone or fax.

Yet further, some delays may be generated in computer networks when the electronic mail±delivered from the transmitting side to the receiving side due to the electronic mail's passage through a number of computers, the amount of data and congestion of the lines.

Further, as the G3 and G4 facsimile communication procedures and the communication methods are different from those of computer networks, direct connection of a facsimile device with a computer network is impossible.

SUMMARY OF THE INVENTION

In order to solve the above mentioned problems, it is an object of the present invention to propose a communication method and communication terminal device that is able to quickly inform the receiving side that it has transmitted electronic mail to a computer network and furthermore, at the receiving side, is able to receive electronic mail from the computer network based on a signal from the transmitting side.

Accordingly, as transmission of electronic mail to a computer network is notified to the receiving side almost simultaneous with the transmission of the mail, the receiving side can quickly be aware that electronic mail has been transmitted.

Furthermore, as the transmission side sends a signal expressing a request for reception of electronic mail simultaneous with transmission of the electronic mail and the receiving side carries out retrieval of the electronic mail from the computer network after receiving the signal expressing a request for reception of the electronic mail, the quick and automatic retrieval of the electronic mail becomes possible.

It is a further object of the present invention to propose a communication terminal device that allows, even when delivery of electronic mail has been delayed, the receiving side to get the electronic mail immediately after it notices the delivery of it.

Accordingly, even if the delivery of the electronic mail in the computer network is delayed, as a suitable timing allowance between the transmission of the electronic mail by the transmitting side and the reception of the electronic mail by the receiving side can be maintained, the situation where the receiving side attempts to receive electronic mail that has not yet been delivered may be avoided.

It is a further object of the present invention to propose a communication terminal device that is able to transmit image data obtained by scanning a document, as electronic mail, and to output the image data of the received electronic mail.

Accordingly, as the document can be scanned and transmitted as electronic mail and image data can be visibly output from the received electronic mail, transmission and reception of documents by e-mails can be carried out just like facsimile communication.

Thus, even when sending a document of many pages to afar place such as abroad, as the document is sent to a computer network as electronic mail, the communication costs may be reduced. In addition, the fact of transmission of electronic mail to the receiving side may be quickly notified and the quick retrieval of the electronic mail may become possible.

DESCRIPTION OF THE PREFERRED EMBODIMENTS

Hereafter, an embodiment of the present invention will be described using the drawings. It should be noted that the present embodiment transmits image data as electronic mail and uses the internet as a computer network.

Figure 1:
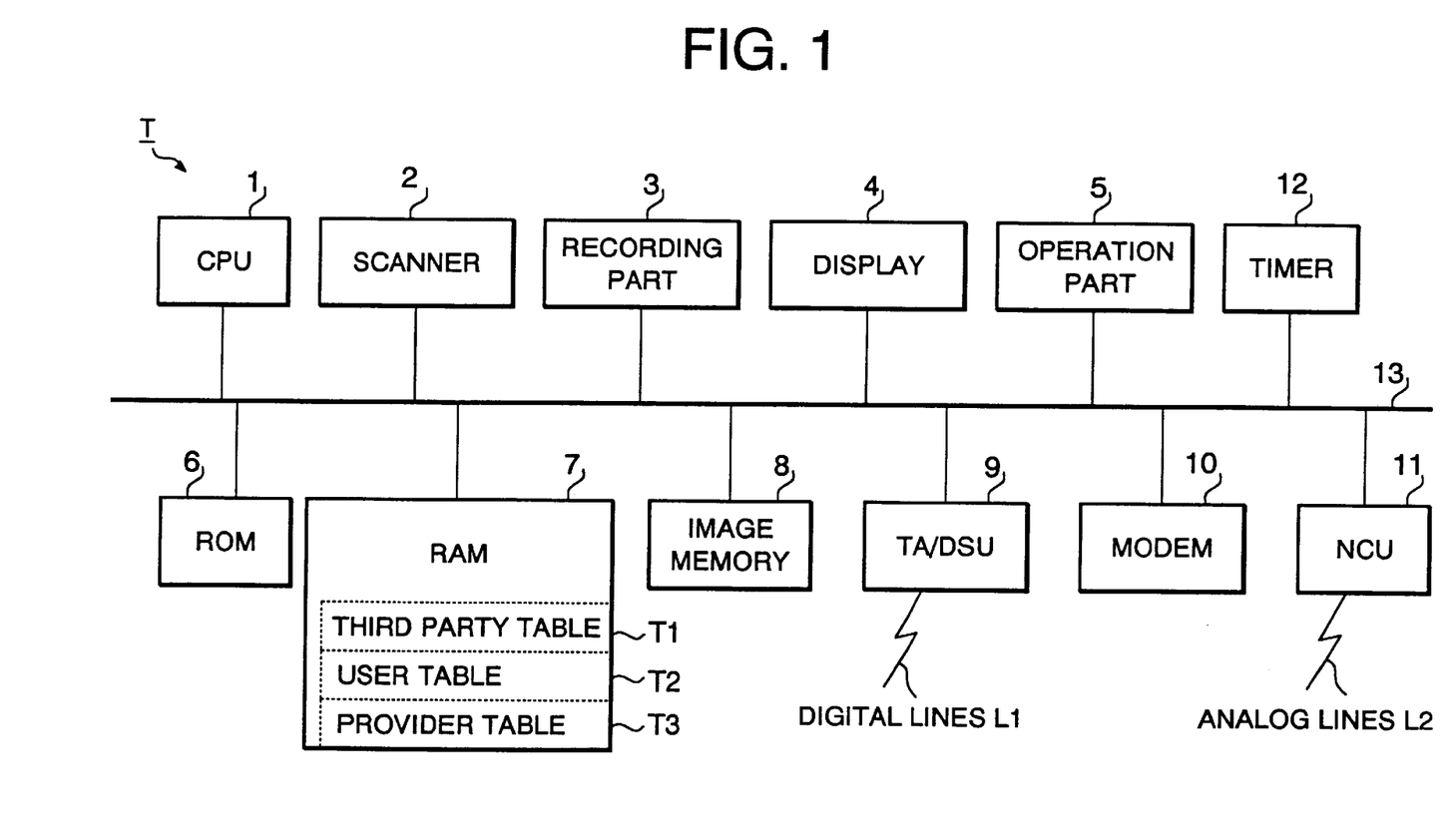
FIG. 1 is a block diagram of one embodiment of the communication terminal device of the present invention.

As shown in FIG. 1, a communication terminal device is provided with functions for communicating with the internet in addition to G3 and G4 facsimile communication functions.

A CPU 1 controls each part of the communication terminal device T via a bus 13 and runs software for the processing of coding, decoding, image conversion, binary text conversion, mail editing, communication procedures and the like which will be described later.

A scanner 2 scans an image on a document by a CCD (Charged Coupled Device) and outputs it as bilevel image data. Recording part 3 is provided with a printer such as a laser xerographic method or the like and records on recording paper image data received from another G3 or G4 facsimile device or the internet.

A display 4 comprising a LCD (Liquid Crystal Display) or the like performs the display of the operating state of the communication terminal device T or image data. Operating part 5 is provided with various types of function keys necessary for operation of the communication terminal device T such as a key pad, speed dial key, one-touch dial key and the like. ROM (Read Only Memory) 6 memorizes software necessary for operation of the communication terminal device T. RAM (Random Access Memory) 7 includes SRAM (Static Random Access Memory) or flash memory (Flash EEPROM; Flash Electrically Erasable Programmable Read Only Memory) and the like. RAM 7 temporarily memorizes the data generated upon execution of the software, and also memorizes each type of table T1, T2, T3 (Refer to FIG. 3) described later.

Image memory 8 includes DRAM (Dynamic Random Access Memory) or the like and temporarily memorizes the image data which is to be transmitted or the image data received. TA/DSU (Terminal Adapter/Digital Service Unit) 9 is connected to digital (ISDN) lines L1. The data sent along digital lines L1 is sent in accordance with a baseband transmission method. Accordingly, TA/DSU 9 converts the transmission data being a digital signal to a voltage change and sends it along the digital lines L1. It further converts the voltage change of the digital lines L1 into a digital signal being the reception data.

Modem 10 is for carrying out modulation/demodulation of the transmission/reception data and is provided with data modem functions as well as conventional fax modem functions. NCU (Network Control Unit) 11 carries out opening and closing of the analog lines L2 and is also provided with functions that transmit a dial pulse corresponding to a third parties fax number and detect an incoming call.

Timer 12 is arranged for measurement of time. The operations of this timer 12 will be described later but, briefly, it measures the time set by a key operation of the operation part 5.

Figure 2:
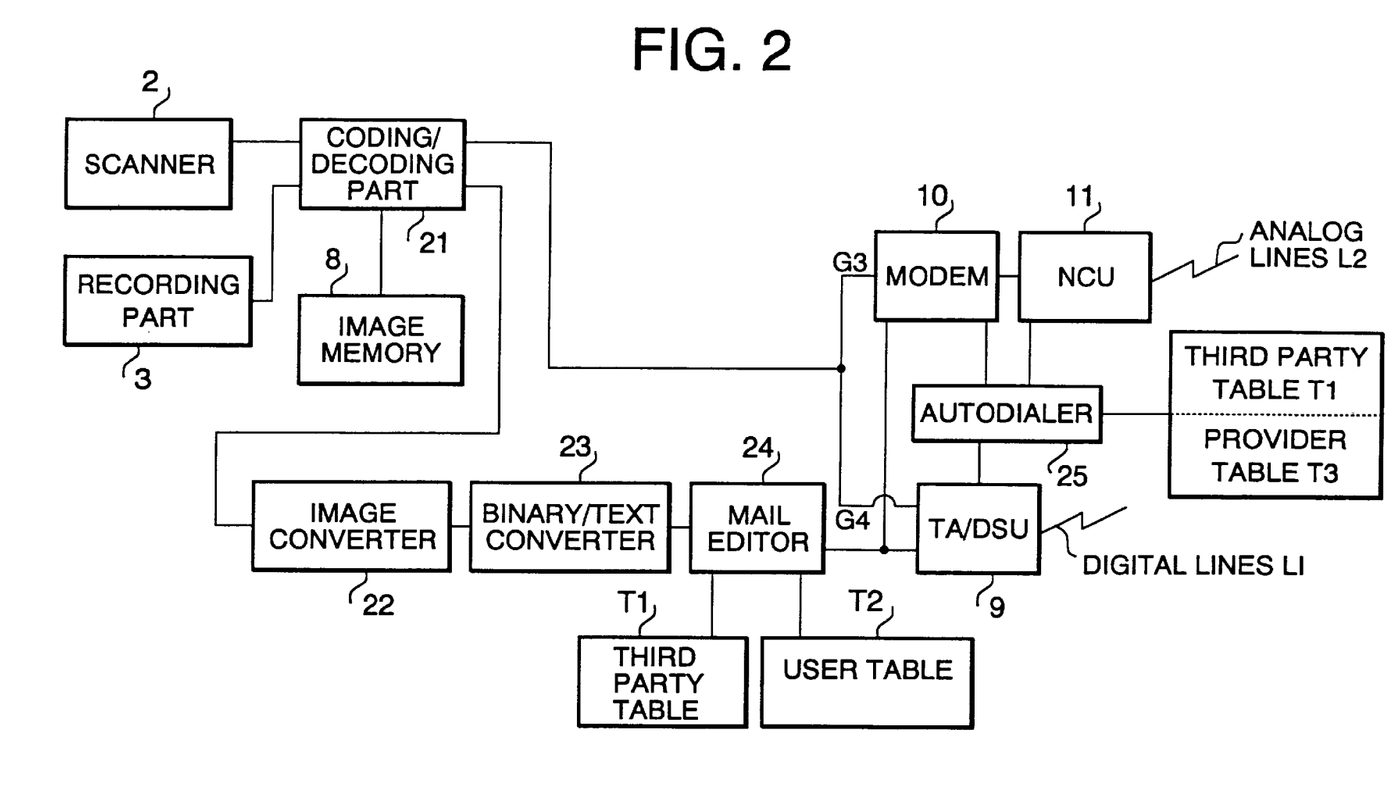
FIG. 2 is a schematic diagram showing the flow of data inside the communication terminal device of the present invention.

FIG. 2 schematically shows a flow of data inside the communication terminal device T of the present embodiment. It should be noted that a coding/decoding part 21, image conversion part 22, binary text conversion part 23, mail editor 24 and auto-dialer 25 in FIG. 2 are parts having functions which the CPU 1 executes based on the software memorized in the ROM 6.

Coding/decoding part 21 codes/decodes the image data by coding methods such as MH (Modified Huffman) method, MR (Modified Read) method, MMR (Modified MR) method or the like. Hereafter the image data coded by these coding methods is called "G3 format image data". The image memory 8 memorizes this G3 format image data.

Image conversion part 22 converts the G3 format image data at the time of transmission into TIFF (Tag Image File Format) being a general image format used by computers and at the time of reception, converts TIFF into G3 format image data. TIFF, which is a standard format for image files proposed by Aldus Co. of America (Currently, taken over by Adobe Systems), does not define the standard data format but its characteristic is that it defines the properties of image data as TAG information. Due to this, when using the TIFF format, the format of the data may be recognized by reading the standardized TAG information written at the start of the image file in a few hundred bytes.

Furthermore, not only a class for handling bilevel images, a variety of classes for handling grey scale images, full color images and the like is defined in TIFF. Class F being one of those classes defines G3 format image data. Accordingly, the image data may be converted to TIFF by, for example, attaching TIFF header information of Class F to the start of the G3 format image data. Hereafter, the G3 format image data to which TIFF header information of Class F has been added is called "TIFF image data".

The binary text conversion part 23 converts the binary data into text data at times of transmission and converts the text data into binary data at times of reception. As there are computers in the internet that are unable to handle binary data electronic mail, in order to reliably deliver electronic mail to a third party, it is necessary to first convert it to text data when binary data such as TIFF image data is transmitted. Text data hand led by the internet is defined as a 7-bit code in RFC (Request for Comments) 822 being a document published by IETF (Internet Engineering Task Force).

Binary text converter part 23 performs conversion of the data using a MIME (Multipurpose Internet Mail Extension) base 64 or the like. Depending on this base 64, the 6-bit binary data is converted to text data by being replaced with one of 64 characters (Large and small letters of the alphabet, numerals, +,/) and padding (=). It should be noted that MIME is defined by RFC 1521 (definition of the MIME header), RFC 1522 and RFC 1590.

Figure 10:
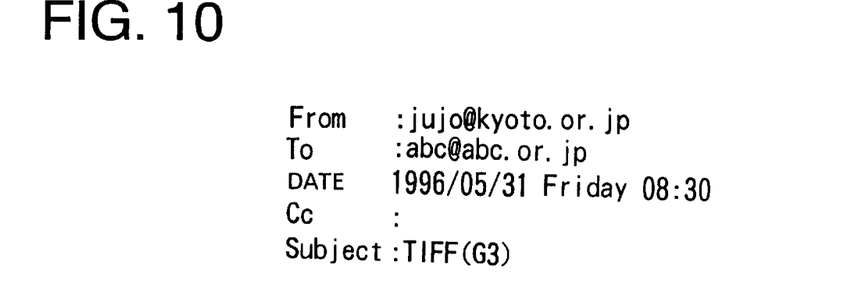
FIG. 10 is an explanatory diagram showing the header of the electronic mail utilized by the communication terminal device of the present invention.

The mail editor 24 attaches mail header information to the TIFF image data converted to text data and edits it to electronic mail format at times of transmission and, at times of reception, removes the mail header information from the data in the electronic mail format and only takes out the TIFF image data converted to text data. As the attachment of predetermined header information to electronic mail of the internet is regulated, items such as "From:" (sender), "To:" (recipient), "Subject:", "Cc:" (multiple addressees), "Date:" and the like are attached to the beginning of the TIFF image data as shown in FIG. 10 at times of transmission based on the data in the third party table T1 and user table T2.

Auto dialer 25 sends the telephone number data of the third party read out from the third party table T1 or provider table T3 in the RAM 7 to the TA/DSU 9, modem 10 or NCU 11, so that it can call that telephone number.

Next, each of the tables T1, T2, T3 memorized in the RAM 7 will be described using FIG. 3.

Figure 3:
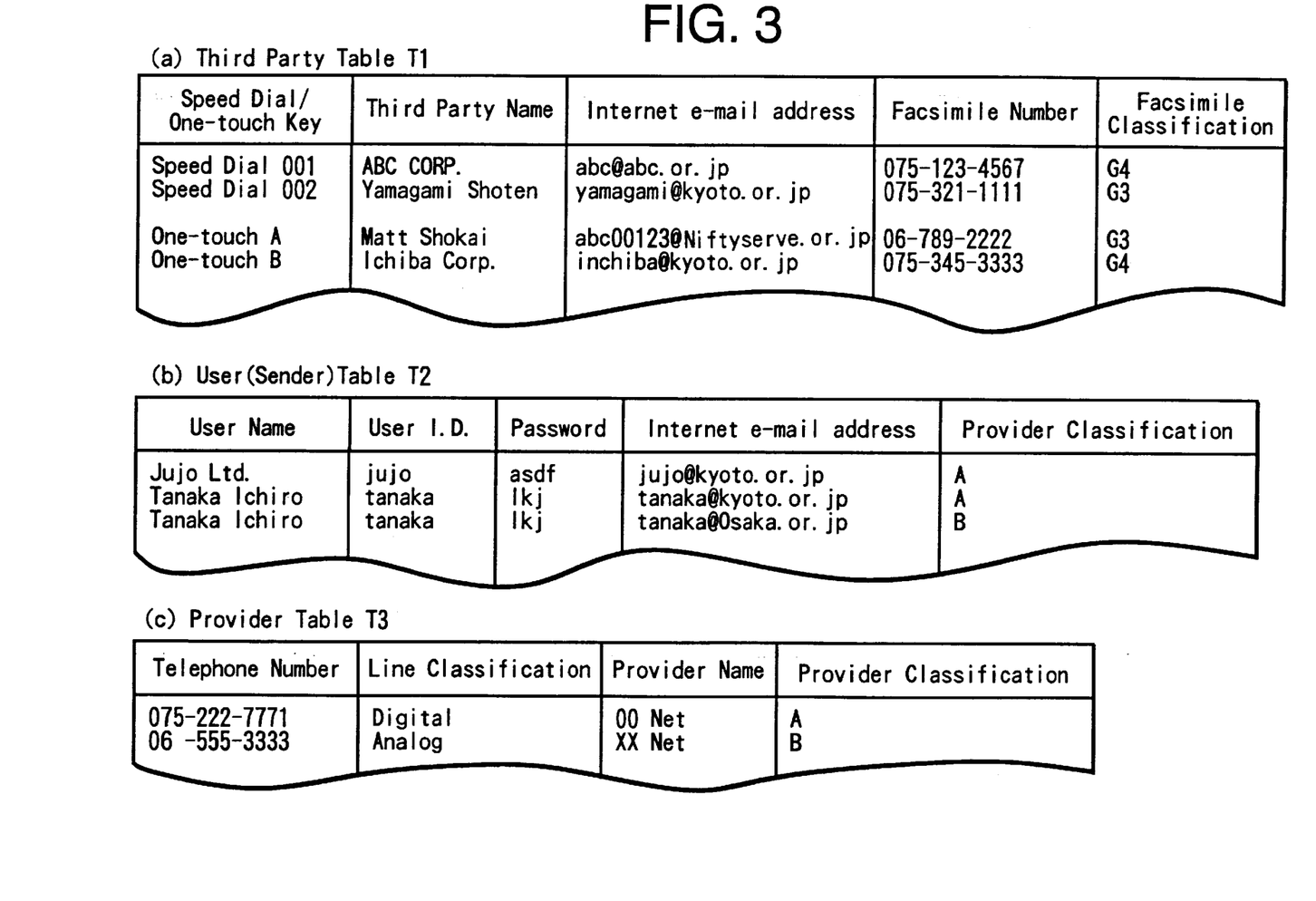
FIG. 3 is an explanatory diagram showing each table memorized in the communication terminal device of the present invention.

As shown in FIG. 3(*a*), data of a third party's name, internet e-mail address, facsimile number and facsimile classification (G3 or G4) is recorded in the third party table T1 for every quick dial key or one touch key.

As shown in FIG. 3(*b*), data of the user name of the communication terminal device T, user ID for logging on to the internet, password, internet e-mail address and provider classification are recorded in the user (sender) table T2. It should be noted that when a plurality of users are jointly using a single communication terminal apparatus in an office etc., each of the above data can be recorded for each user and selection of data corresponding to the user is possible at times of transmission.

As shown in FIG. 3(*c*), data of the telephone number of the provider to be used when connecting to the internet, line classification (analog or digital), provider name and provider classification are recorded in the provider table T3. The provider classification corresponds to the provider classification of user table T2 and is for discriminating the log-in procedures differing for each provider. When a single provider has a plurality of telephone lines or when one user uses a plurality of providers, each of the above data can be recorded for each telephone number and the necessary data may be selected at times of transmission.

Next, the procedures for sending electronic mail to the internet will be described. The communication protocols used at each layer of the OSI (Open Systems Interconnections) reference model are those shown in Table 1.

TABLE 1.

| | |
|---|---|
| Layer 7 (Application layer) | Transmission: SMTP (Simple Mail Transfer Protocol) |
| Layer 6 (Presentation layer) | Reception: POP (Post Office Protocol) |
| Layer 5 (Session layer) | |
| Layer 4 (transport layer) | TCP (Transmission Control Protocol) |
| Layer 3 (Network layer) | IP (Internet Protocol) |
| Layer 2 (Data Link layer) | V.34 etc. (Analog lines etc.) |
| Layer 1 (Physical layer) | X.25 (Digital lines) |

Hereafter, SMTP (Simple Mail Transfer Protocol) will be described. SMTP is one type of TCP/IP application protocol and is a protocol for transmitting electronic mail in a text format to an optionally selected user. Mail can be reliably and efficiently transmitted as a result of this SMTP. It should be noted that SMTP is regulated by RFC 822.

Figure 4:
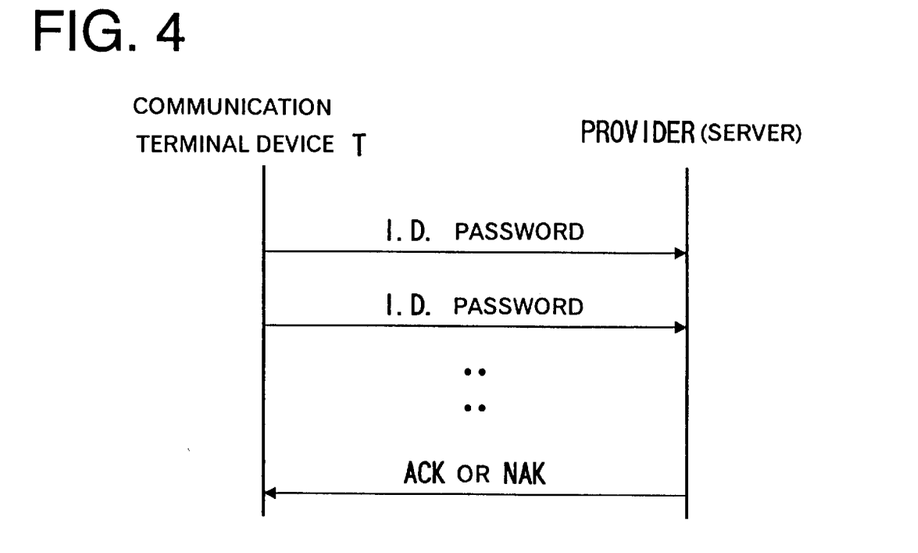
FIG. 4 is an explanatory diagram showing the log-in procedures to the server by the communication terminal device of the present invention.

Next, the log-in procedures will be described. As shown in FIG. 4, when a line is established between the communication terminal device T and the computer (hereafter, called server) of the provider, transmission of the user ID and password is continued in accordance with PAP (Password Authentication Protocol) for example, until an "ACK" (Acknowledge: Positive response) or "NAK" (Negative Acknowledge:Response refused) is received from the provider. When "NAK" is received, the transmission is retried the number of times set by the protocol and if all the responses are "NAK", the lines are disconnected and redialling is performed. Once "ACK" is received, the log-in to the server is complete.

Figure 5:
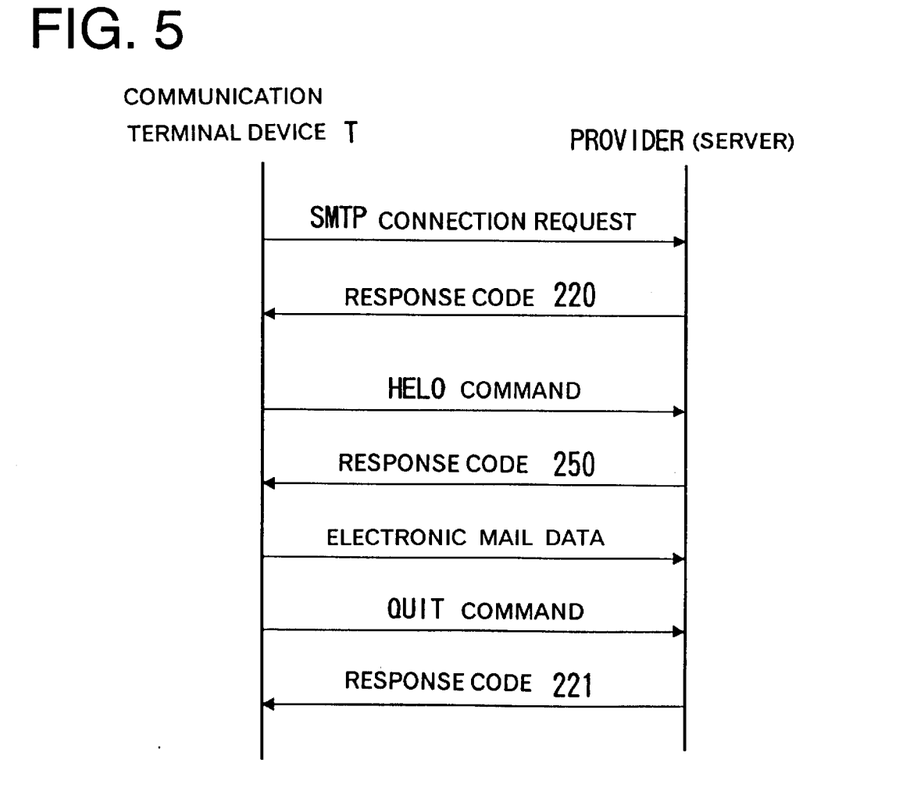
FIG. 5 is an explanatory diagram showing the procedures for transmission of electronic mail to the server by the communication terminal device of the present invention.

As shown in FIG. 5, after completion of log-in with the server, electronic mail is sent by SMTP. In short, firstly the communication terminal device T requests a SMTP connection to the server. If connection with the server is possible, the server returns a response code "220" (representing completion of preparations at the server) to the communication terminal device T. Furthermore, the communication terminal device T sends its own domain name by a "HELO" command and if the server is able to recognize the domain name of the communication terminal device T, a response code "250" (representing normal completion of the requested command) and domain name of the server are returned. Thereafter, the communication terminal device T transmits the mail and when transmission is complete, it sends a "QUIT" command. In response to this, when the server returns the response code "221" (representing connection close (response to the QUIT)), SMTP procedures are complete. After completion of transmission of the electronic mail, the communication terminal device T logs off from the server and the lines are disconnected.

Next, the operations of the communication terminal device T of the present embodiment performed when it is the transmission side will be described based on the flow charts of FIG. 6 and FIG. 7. It should be noted that steps S1–S4 are operations which the user performs while subsequent steps are executed by the CPU 1 based on the software memorized in the ROM 6.

Figure 6:
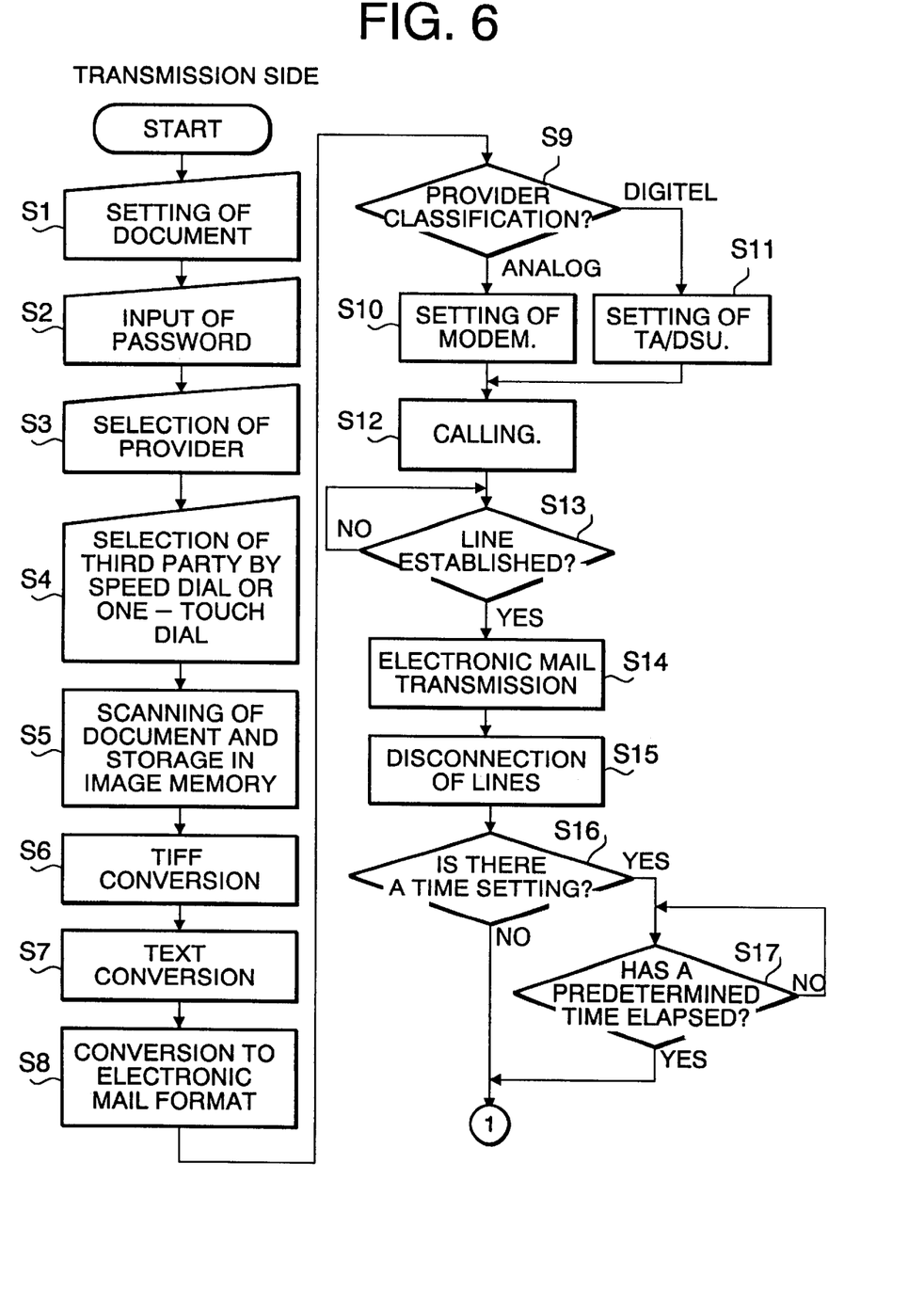
FIG. 6 is a flow chart showing the operations of the transmitting side.

As shown in FIG. 6, after the user firstly sets a document to be transmitted in the transmission table (omitted from drawing) (S1), a password (passcode) is entered by a key operation of the operation part 5 (S2). The user name expressing the user corresponding to the password is selected from the user table T2 in the communication terminal device T by the inputting of this passcode. It should be noted that the specification of the user name by the passcode is to prevent inappropriate use by another person. This passcode may be the same as the password for connecting to the internet.

Next, the user selects the provider and lines to be used from the provider table T3 by a key operation of the operation part 5 (S3).

Subsequently, the user presses the start key (omitted from drawing) after selecting and pushing the short dial or one touch key corresponding to the third party to whom the mail to be sent (S4). As a result, the transmission third party is selected from the third party table T1 at the communication terminal device T.

Next, the document in the document table is scanned one page at a time by the scanner 2, and the scanned image data of all the pages is coded by, for example, MMR method at the coding/decoding part 21 and stored in the image memory 8 as G3 format image data (S5).

Incidentally, as image data can not be directly transmitted through the internet, it is changed to electronic mail format as follows. Firstly, a Class F header information of TIFF is attached to the top of the G3 format image data and TIFF image data is produced (S6).

As the TIFF image data is binary data, the TIFF image data is converted to text data at the binary text conversion part 23 (S7).

In continuance, at the mail editor 24, an electronic mail header is attached to the TIFF image data converted to text data. As shown in FIG. 10, this header includes at least items "From:", "To:" and "Subject:". "From:" is set as the internet e-mail address of the user chosen from the user table T2 at step S2, "To:" is set as the internet e-mail address of the third party selected from the third party table T1 at the aforementioned step S4 and "Subject:" is set as "TIFF (G3)" showing that it is an electronic mail including TIFF format image data (S8).

When the data in the electronic mail format has been completed, a dial up connection to the internet is performed (S9–S13). In short, the classification of the line (analog or digital) of the provider selected at the aforementioned step S3 is determined based on the provider table T3 (S9) and if analog, the modem 10 is set up (S10). If digital, the TA/DSU 9 is set up (S11). The telephone number of the selected provider is then called (S12) based on the provider table T3 and the response is awaited (S13).

Once the telephone line between the communication terminal device T and the provider has been established, log-in procedures in accordance with the aforementioned PAP are performed and the electronic mail is transmitted by SMTP (S14). After completion of transmission, log-off is performed and the telephone lines are disconnected (S15).

Next, determination is carried out of whether there is a set time in the timer 12 or not (S16). If there is no setting, the procedures move to the next step S18 of FIG. 7. When there is a setting, the device waits from the disconnection of the lines until the pre-set predetermined time (for example, 10 minutes) has elapsed (S7) and after the predetermined time has elapsed, the procedures move to step S18 of FIG. 7.

Figure 7:
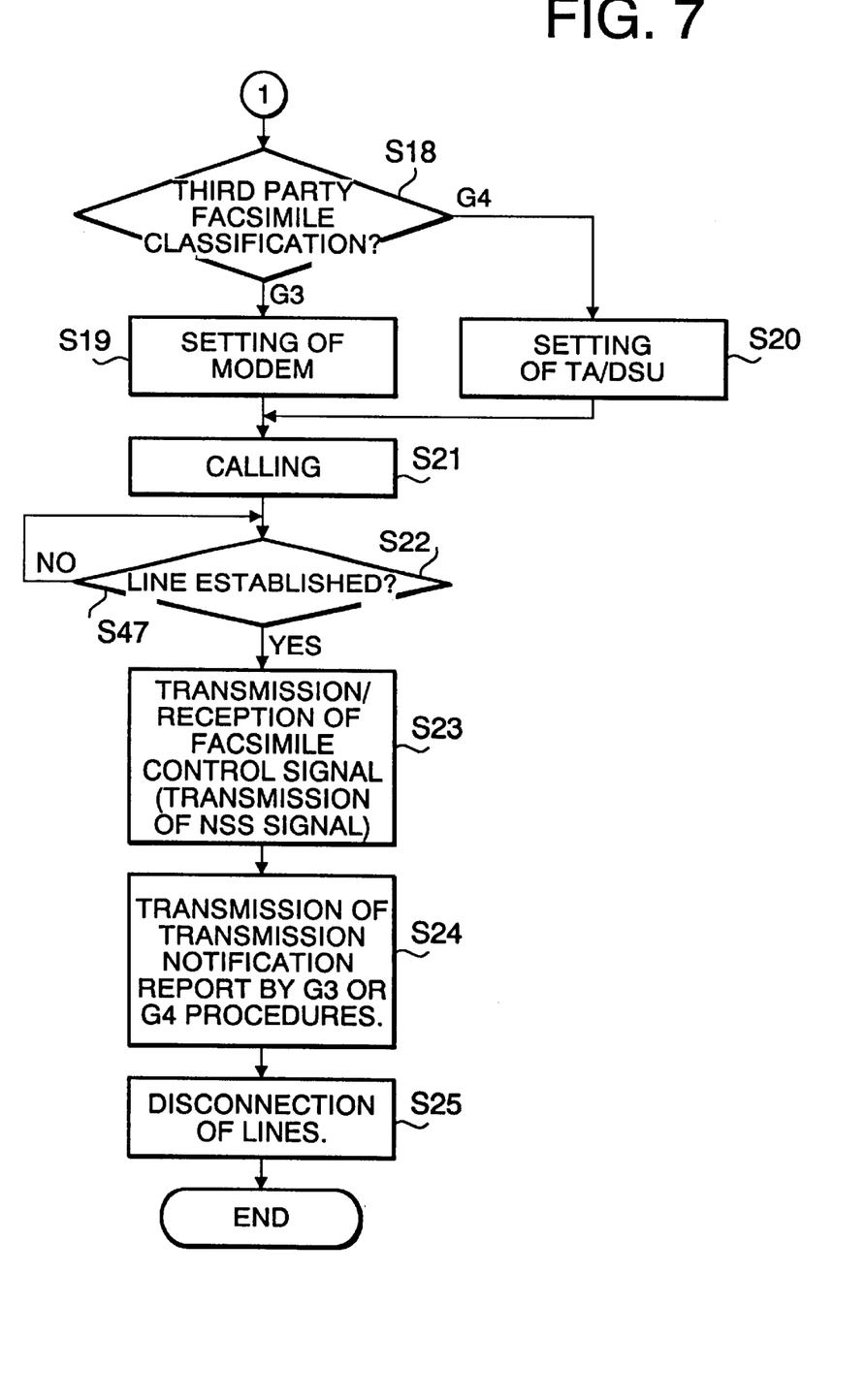
FIG. 7 is a flow chart showing the operations of the transmitting side.

At step S18 of FIG. 7 the facsimile classification (G3 or G4) of the third party selected at step S4 is discerned (S18) and if G3, the modem 10 is set up (S19) and if G4, the TA/DSU 9 is set up (S20). Then the facsimile number of the selected third party is called (S21) based on the third party table T1.

Once the third party's facsimile device has replied and a line has been established (S22), various types of facsimile control signals are exchanged between the two facsimile devices (S23). An NSS (Non-Standard facilities Set-up) signal is included in the facsimile control signals sent to the third party. Information indicating a request for reception of the electronic mail sent a short while previously (reception request information), the internet e-mail address of the party to which the electronic mail was sent and the internet e-mail address and facsimile number data of the user selected in the aforementioned step S2 are stored in this NSS signal.

Figure 11:
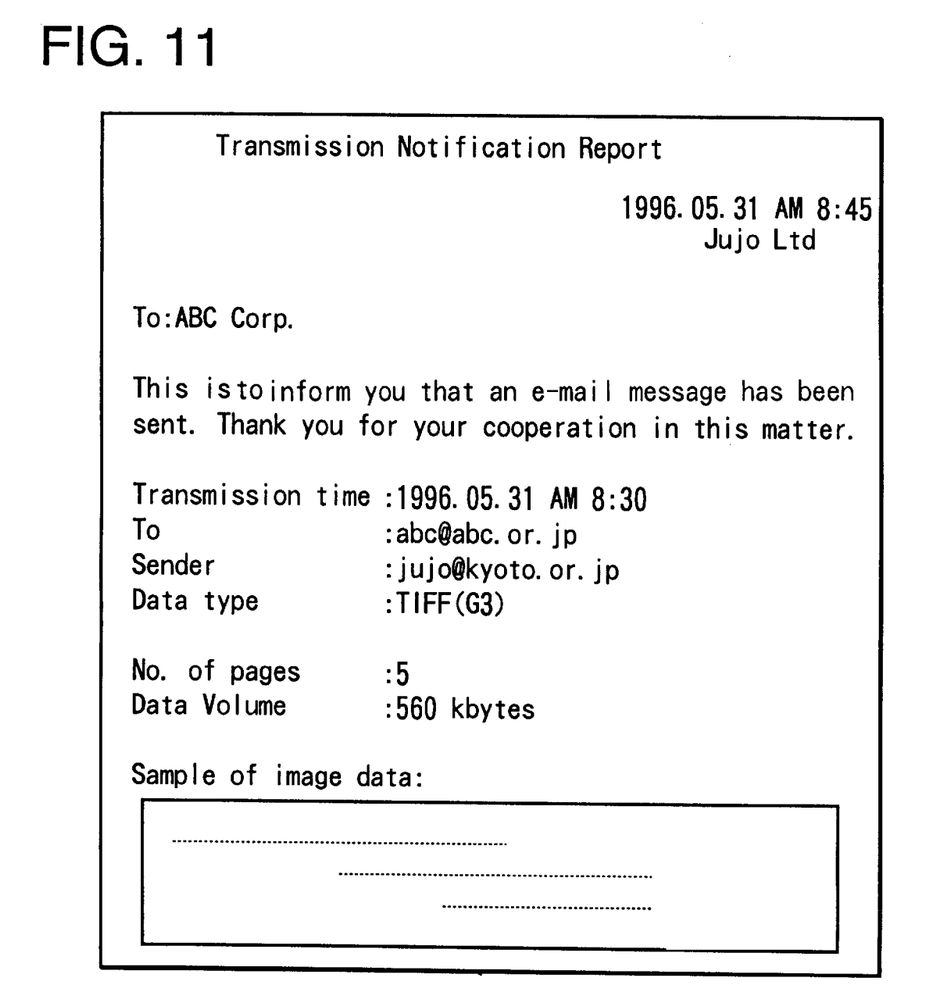
FIG. 11 is an explanatory diagram showing the transmission notification (report) produced by the communication terminal device of the present invention.

Next, a transmission notification (report) as shown in FIG. 11 is sent by either G3 or G4 procedures (S24) and after completion of transmission, the lines are disconnected (S25). Notification that electronic mail has been sent is written on this transmission notification.

Next, the operations of when the communication terminal device of the present embodiment is the receiving side will be described based on the flow charts of FIGS. 8 and 9. It should be noted that these operations are executed by the CPU 1 based on software memorized in the ROM 6.

Figure 8:
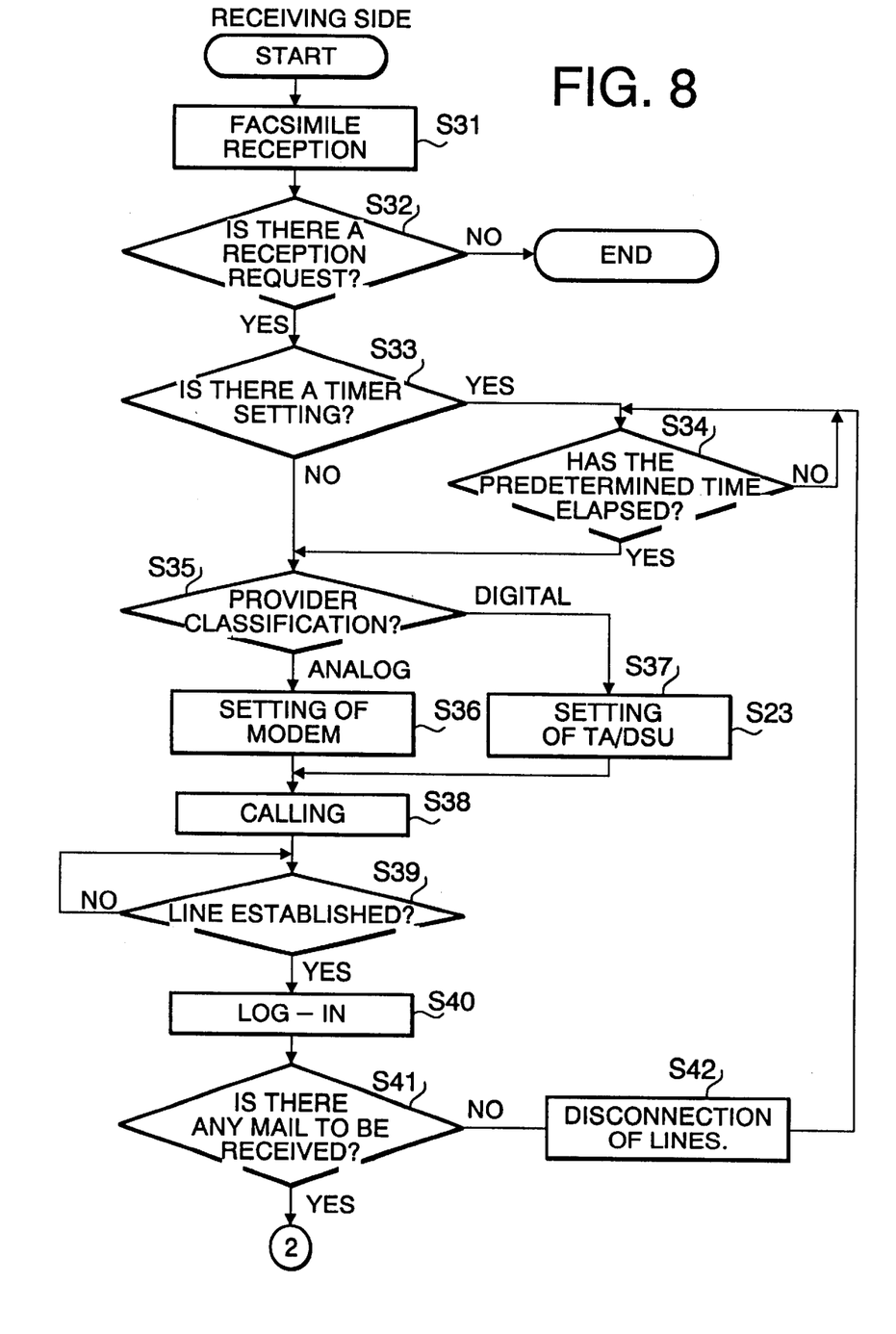
FIG. 8 is a flow chart showing the operations of the receiving side.

As shown in FIG. 8, when there is a facsimile reception from the transmission side (S31), determination is carried out of whether information requesting reception of electronic mail (reception request information) is present in the received NSS signal (S32). When reception request information is present in the NSS signal, it is determined that reception of electronic mail is necessary and procedures move to step S33. When no reception request information is present, the communication is determined to be normal facsimile communication and processing finishes. It should be noted that when reception request information is present in the NSS signal, a transmission notification as shown in FIG. 11 is received and printed on the recording paper by a facsimile reception at step S31. At step S33, determination is carried out whether there is a set time in the timer 12. When there is no set time, procedures move to step S35. When there is a set time, the device waits from completion of facsimile reception until the pre-set predetermined time (for example, 10 minutes) has elapsed (S34) and after the predetermined time has elapsed, the procedures move to step S35.

At step S35, based on the internet e-mail address of the receiving side third party (in short, the user of the receiving side communication terminal device T) expressed in the NSS signal received a short time previously, the provider and that classification (analog or digital lines) are determined by reference to the user table T2 and provider table T3 (S35). Thus, if the provider has analog lines, the modem 10 is set up (S36) and if it has digital lines, the TA/DSU 9 is set up (S37). The telephone number of the selected provider is then called (S38) and a response awaited (S39).

Once a telephone line has been established with the provider and after log-in procedures in accordance with the aforementioned PAP (S40), determination is performed of whether mail has been delivered to the provider or not (S41). When there is no electronic mail at the provider, the lines are disconnected (S42) and after a predetermined time period has elapsed, procedures return to the aforementioned step S34 such that reception of electronic mail is once again possible. When electronic mail is at the provider, procedures move to step S43 of FIG. 9.

At step S43, the electronic mail at the provider is received and printed out on the recording paper by the recording part 3 (S44). When this recording is to be performed, the received electronic mail is recorded after conversion to G3 format image data. If conversion to G3 format image data is impossible, only the header information is recorded.

It should be noted that there may have been electronic mail delivered to the provider from a third party other than that expressed in the NSS signal received during the facsimile transmission of a short time previously. Accordingly, when electronic mail is at the provider, when that electronic mail is to be received, internet e-mail address shown at "From" in the electronic mail header information and the internet e-mail address of the party displayed in the NSS signal received a short while previously are compared. Then, when the compared addresses are not the same, it is determined that the electronic mail of which reception was requested by the previously received facsimile has not yet been delivered to the provider and the procedures return to step S34. In this way, the electronic mail of which reception was requested by facsimile communication may be reliably received.

Thereafter, determination is performed of whether there is a setting to send a reception notification by electronic mail (345). When there is a setting, a reception notification (report) is sent by electronic mail (S46) and after completion of transmission, the lines are disconnected (S47) and procedures are concluded.

When there is no setting to send a reception notification by electronic mail, discernment of the facsimile classification of the third party (G3/G4) is performed based on the third party table T1 (S49) after disconnection of the lines (S48). Then, if it is G3, the modem 10 is set up (S50) and if it is G4, the TA/DSU 9 is set up (S51) and the facsimile number of the third party is then called (S52).

Figure 12:
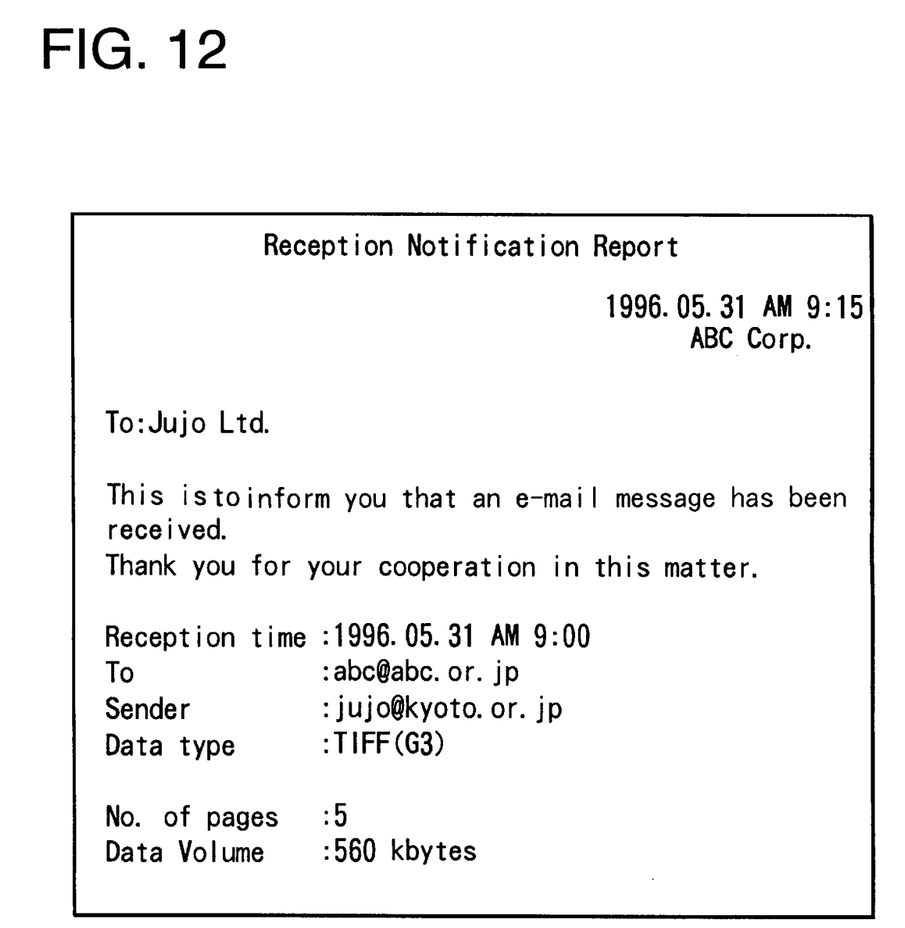
FIG. 12 is an explanatory diagram showing the reception notification (report) produced by the communication terminal device of the present invention.

When the third party's facsimile device has replied and a line has been established (S53), a reception notification as shown in FIG. 12 is sent by either G3 or G4 procedures (S54) and after completion of transmission, the lines are disconnected (S55). It should be noted that the fact that the electronic mail has been received is written on this reception notification.

The present embodiment as described above demonstrates the following advantages and effects.

(1) After sending electronic mail on the internet, that fact can be notified to the receiving side by a transmission notification via facsimile transmission. Moreover, at the time of facsimile transmission, information which requests reception of the electronic mail is sent to the receiving side. In short, an NSS signal is sent as a reception request signal requesting reception of the electronic mail. In addition, the facsimile communication is carried out by the circuit switching method. Due to this, the transmission of electronic mail can be quickly notified to the receiving side, and furthermore, the receiving side can automatically receive electronic mail addressed to itself from the provider based on that reception of the NSS signal.

(2) As only information stating that electronic mail has been sent is informed by facsimile communication while the contents of the actual electronic mail are sent via the internet, an increase in communication costs for communication over long distances such as overseas may be restricted.

(3) When the transmitted electronic mail is received at the receiving side, a reception notification informing of reception is automatically transmitted by electronic mail or facsimile communication to the party which sent the electronic mail thus the party which sent the electronic mail is able to reliably confirm whether or not the electronic mail has been delivered.

(4) As the image data used in facsimile communication is converted to text data, reliable transmission over the internet as electronic mail is possible even with image data scanned from the document. (5) Delays in transmission (from when sending the electronic mail until delivery of that electronic mail to the provider with which the receiving side has made a contract) are sometimes caused on the internet due to the passage of the electronic mail through a plurality of computers, the large amount of data, congestion of the lines and the like.

However, in the present embodiment, in the transmission side, a time lag may be set by the timer 12 between the transmission of the electronic mail and the facsimile transmission. As a result, a request to the receiving device for reception of the electronic mail is possible in consideration of the time it takes the electronic mail to be delivered to the provider with which the receiving side has contracted. Accordingly, the receiving side can reliably receive electronic mail from the provider as it immediately dials the provider in response to there quest from the transmitting side by facsimile communication.

Furthermore, at the receiving side, a time lag may be set by the timer 12 between the facsimile reception and the dialing of the provider. As a result, starting of reception of the electronic mail is possible in consideration of the time it takes the electronic mail to be delivered to the provider from the transmission side. Accordingly, the receiving side can reliably receive electronic mail from the provider when it dials the provider in response to the request from the transmitting side by facsimile communication.

It should be noted that the setting of the timer 12 need to be carried out at least either the transmission side or reception side. Furthermore, this setting may be set depending on the distance with the other party. For example, the setting time may be changed according to country numbers or local numbers.

(6) When the electronic mail from the transmitting side has not yet been delivered to the provider upon the receiver side's dialing the provider, automatic redialling may be performed after a predetermined time period has elapsed thus electronic mail of which reception have been requested from the transmitting side may be more reliably received.

(7) The transmission state of the reception notification may be optionally set as either electronic mail or facsimile communication in accordance with the wishes of the user and is thus convenient.

It should be noted that changing the aforementioned embodiment as follows is possible and the same effects and advantages can be obtained even with this alteration.

(a) Data may be converted to BMP (Bitmap) format, JPEG (Joint Photographic Experts Group) format, GIF format, EPS format, IFF format or PICT format instead of the TIFF format. Or the MH, MR etc. facsimile image data may be transmitted unaltered without being converted to TIFF format.

Figure 9:
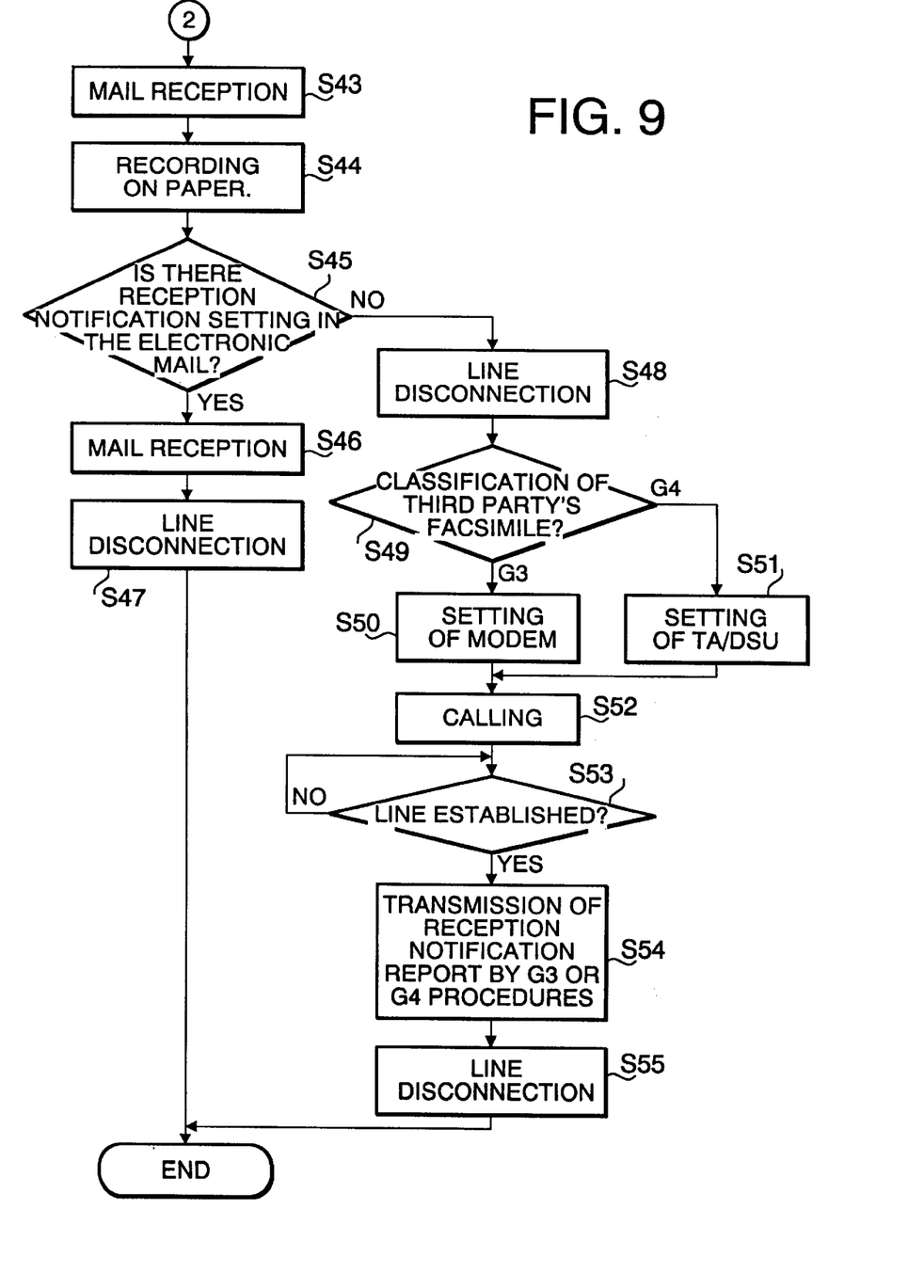
FIG. 9 is a flow chart showing the operations of the receiving side.

(b) At step S34 of FIG. 9, the received electronic mail may be displayed in the display 4 instead of being printed out on the recording paper.

(c) Electronic mail may be transmitted over the internet after notification by facsimile transmission of the information which requests reception of the electronic mail. In this case, it is necessary to carry out time setting by the timer 12 at the receiving device in consideration of the time it takes the electronic mail to be delivered to the provider after the request for reception of electronic mail.

(d) Transmission of electronic mail over the internet and electronic mail reception request by facsimile communication may be carried out in parallel. In this case, as it is necessary to use two sets of lines simultaneously, the digital lines L1 and analog lines L2 will be used for the internet and facsimile respectively. Parallel execution of transmission of electronic mail over the internet and electronic mail reception request by facsimile communication reduces the whole processing time of the communication terminal device T.

(e) Data other than bilevel image data may be sent over the internet as electronic mail. For example, image data such as grey scale and color may be transmitted as TIFF image data. In this case, the transmission data may be converted to the BMP format, JPEG format, GIF format, EPS format, IFF format or PICT format instead of the TIFF format. Furthermore, even with data other than image data such as voice or moving images, an electronic mail reception request may be performed by facsimile communication.

(f) A computer communication network other than the internet may be used.

(g) Instead of NSS, a specific DTMF (Dual Tone Multi Frequency) may be used as an electronic mail reception request signal.

What is claimed is:

1. A communication method comprising:
 a step of a transmitting side transmitting an electronic mail to a computer network;
 a step of the transmitting side notifying a receiving side via a reception request signal containing data for identifying the electronic mail of the transmission of electronic mail by a circuit switching method; and a step of the receiving side retrieving the electronic mail from the computer network in response to the reception request signal received from a telephone network, wherein the reception request signal is an NSS signal which comprises an e-mail address of said transmitting side, wherein said steps of transmitting an electronic mail and reception request signal are carried out in parallel.

2. A communication method comprising:

a step of a transmitting side transmitting an electronic mail to a computer network;

a step of the transmitting side transmitting a reception request signal containing data for identifying the electronic mail to a receiving side by a circuit switching method which signal indicating a request for reception of the electronic mail; and a step of the receiving side retrieving the electronic mail from the computer network in response to the reception of the reception request signal by the circuit switching method via a telephone network, wherein the reception request signal is an NSS signal which comprises an e-mail address of said transmitting side, wherein said steps of transmitting an electronic mail and reception request signal are carried out in parallel.

3. A communication terminal device comprising:

electronic mail transmission means for transmitting an electronic mail to a computer network; and transmission notification transmission means for transmitting by a circuit switching method a transmission notification that notifies a receiving side via a reception request signal containing data for identifying the electronic mail of electronic mail transmission, wherein the receiving side retrieves the electronic mail from the computer network in response to the reception request signal received from a telephone network, wherein the reception request signal is an NSS signal which comprises an e-mail address of said transmitting side, wherein said transmission of an electronic mail and reception request signed are carried out in parallel.

4. A communication terminal device comprising:

electronic mail transmission means for transmitting an electronic mail to a computer network; and reception request signal transmission means for transmitting by a circuit switching method a reception request signal containing data for identifying the electronic mail to a receiving side and indicating a request for reception of the electronic mail, wherein the receiving side retrieves the electronic mail from the computer network in response to the reception request signal received from a telephone network, wherein the reception request signal is an NSS signal which comprises an e-mail address of said transmitting side, wherein said transmission of an electronic mail and reception request signed are carried out in parallel.

5. A communication terminal device comprising:

reception request signal reception means for receiving by a circuit switching method a reception request signal containing data for identifying an electronic mail indicating a request for reception of the electronic mail; and electronic mail retrieving means for retrieving the electronic mail from a computer network in response to the reception of the reception request signal by the reception request signal reception means via a telephone network, wherein the reception request signal is an NSS signal which comprises an e-mail address of said transmitting side, wherein said retrieving of an electronic mail and reception request signed are carried out in parallel.

6. The communication terminal device of claim 3 further including timer means for measuring elapse of a predetermined time period, wherein after transmission of electronic mail by the electronic mail transmission means, the transmission notification transmission means transmits a transmission notification after the predetermined time period has elapsed according to the timer means.

7. The communication terminal device of claim 4 further including timer means for measuring elapse of a predetermined time period, wherein after transmission of electronic mail by the electronic mail transmission means, the reception request signal transmission means transmits a reception request signal after the predetermined time period has elapsed according to the timer means.

8. The communication terminal device of claim 5 further including timer means for measuring elapse of a predetermined time period, wherein after reception of the reception request signal by the reception request signal reception means, the electronic mail reception means receives the electronic mail after the predetermined time period has elapsed according to the timer means.

9. The communication terminal device of any of claims 3, 4, 6 or 7 further including:

image scanning means for producing image data by scanning a document; and first conversion means for converting the image data scanned by the image scanning means into electronic mail.

10. The communication terminal device of claim 9, wherein the first conversion means includes means for converting binary data to text data.

11. The communication terminal device of any of claims 5 or 8 further including:

second conversion means for converting the electronic mail received by the electronic mail reception means into image data; and output means for visibly outputting the image data converted by the second conversion means.

12. The communication terminal device of any of claims 5, or 8 wherein the electronic mail retrieving means makes another attempt to receive electronic mail after a predetermined time period has elapsed if the electronic mail could not be received the previous time.

13. The communication terminal device of any of claims 5, or 8 further including reception notification transmission means for transmitting a reception notification to the transmitting side by a circuit switching method after reception of the electronic mail.

14. The communication terminal device of any of claims 3 to 8, wherein the communication by the circuit switching method is facsimile communication along a public subscriber telephone network.

15. The communication terminal device of claim 9, wherein the communication by the circuit switching method is facsimile communication along a public subscriber telephone network.

16. The communication terminal device of claim 10, wherein the communication by the circuit switching method is facsimile communication along a public subscriber telephone network.

17. The communication terminal device of any of claims 3 to 8, wherein the computer communication network is the internet.

18. The communication terminal device of claim 9 wherein the computer communication network is the Internet.

19. The communication terminal device of claim 10 wherein the computer communication network is the internet.

20. The communication terminal device of claim 14 wherein the computer communication network is the internet.

21. The communication terminal device of claim 15 wherein the computer communication network is the internet.

22. The communication terminal device of claim 16 wherein the computer communication network is the internet.

23. A communication method comprising:

a step of a transmitting side transmitting an electronic mail to a computer network simultaneous with its transmitting a reception request signal containing data for identifying the electronic mail to a receiving side by a circuit switching method, the reception request signal indicating a request for reception of the electronic mail; and a step of the receiving side retrieving the electronic mail from the computer network a predetermined period after reception of the reception request signal by the circuit switching method via a telephone network, wherein the reception request signal is an NSS signal which comprises an e-mail address of said transmitting side, wherein said steps of transmitting an electronic mail and reception request signal are carried out in parallel.

* * * * *